United States Patent [19]
Nicholson

[11] 3,966,438
[45] June 29, 1976

[54] APPARATUS FOR WASHING STACK GASES

[76] Inventor: Jerry W. Nicholson, 668 SW. McVey, Apt. 59, Lake Oswego, Oreg. 97034

[22] Filed: Dec. 5, 1974

[21] Appl. No.: 529,819

[52] U.S. Cl. ................................ 55/238; 55/358;
55/442; 55/447; 55/461; 55/465; 55/467;
110/119; 261/17; 261/30; 261/79 A;
261/116; 261/DIG. 9
[51] Int. Cl.² ...................................... B01D 47/10
[58] Field of Search ............ 261/79 A, 116, 30, 17,
261/DIG. 9, 109; 55/237, 238, 260, 358,
442–447, 461, 465, 467, 468, 418; 110/119

[56] References Cited
UNITED STATES PATENTS

| 585,568 | 6/1897 | Greiwe | 261/79 A |
|---|---|---|---|
| 1,041,617 | 10/1912 | Goodrich | 261/DIG. 9 |
| 1,112,860 | 10/1914 | Smith | 261/17 X |
| 1,620,826 | 3/1927 | Mitchell | 261/DIG. 9 |
| 1,639,179 | 8/1927 | Hamel | 261/116 X |
| 2,092,305 | 9/1937 | Estes et al. | 261/116 X |
| 2,802,543 | 8/1957 | Clark | 261/DIG. 9 |
| 3,608,873 | 9/1971 | Furlong | 261/30 |
| 3,714,764 | 2/1973 | Gething | 261/79 A X |
| 3,800,513 | 4/1974 | Lappin | 261/79 A X |
| 3,802,329 | 4/1974 | Wright | 55/238 X |
| 3,811,252 | 5/1974 | Evans et al. | 261/109 X |
| 3,841,063 | 10/1974 | Absher et al. | 55/358 X |

Primary Examiner—Frank W. Lutter
Assistant Examiner—Kathleen J. Prunner
Attorney, Agent, or Firm—Oliver D. Olson

[57] ABSTRACT

A horizontal tubular housing is supported at one of its ends across the top of a stack and a blower is mounted at one end of the housing for moving gases discharged from the stack through the housing. The housing has a plurality of laterally disposed baffle plates arranged such that when impinged by the moving stack gases, the latter will be directed in a tortuous path, preferably an initial spiral path and a subsequent zig zag path. Some of the baffle plates are adjustable to vary the turbulence of the gases in their tortuous movement. Spray nozzles are mounted in the housing at most of the baffle plates to provide curtains of liquid spray for washing the gases. The housing has a liquid drainage outlet in its bottom wall intermediate its ends, and such bottom wall is inclined downwardly from opposite ends of the housing to the outlet to provide drainage. Adjustable louvers are provided in the outlet of the blower to vary the direction of air movement from the blower across the stack.

5 Claims, 8 Drawing Figures

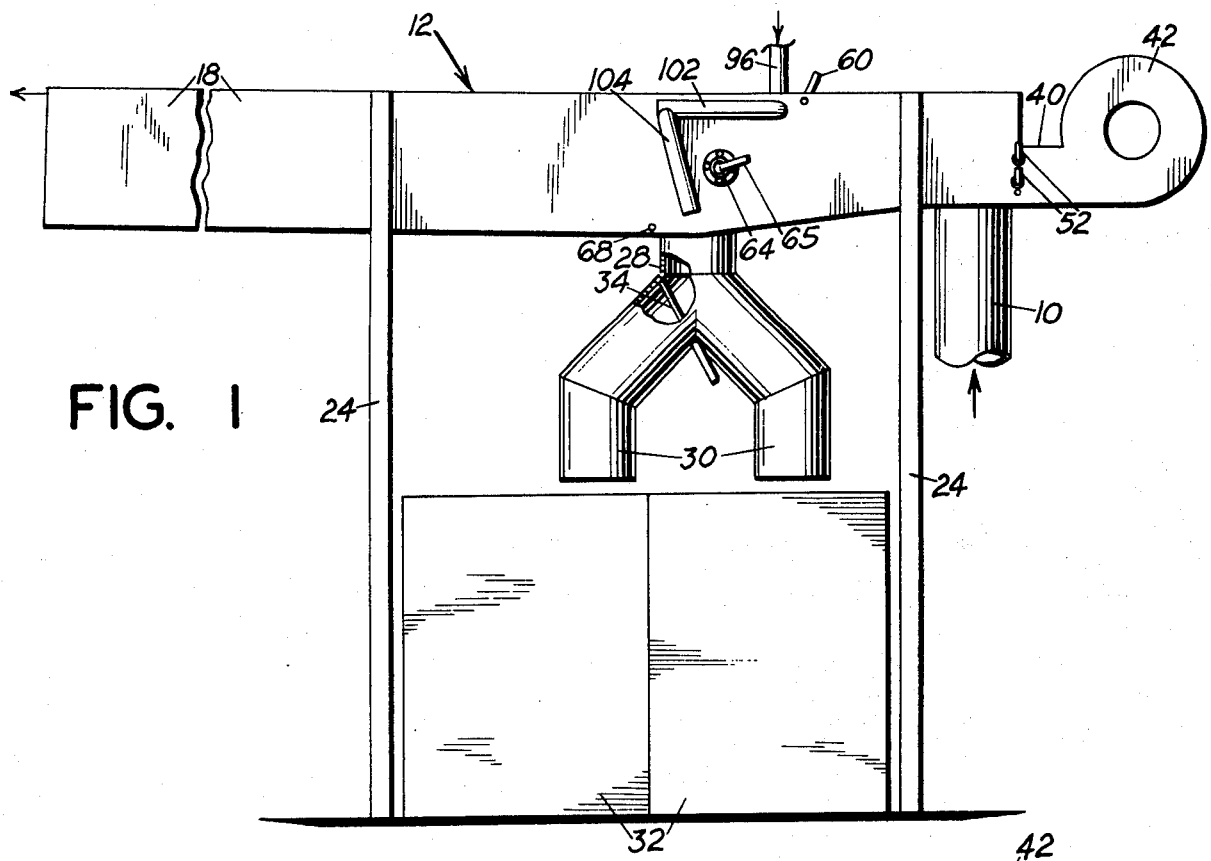
FIG. 1
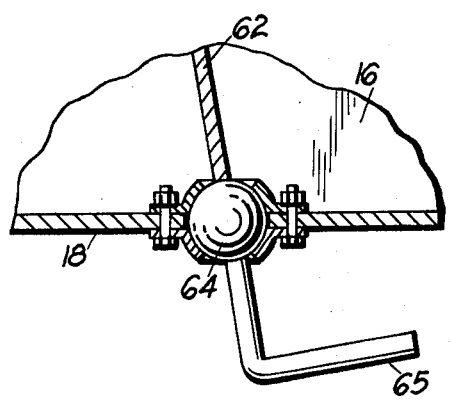
FIG. 6
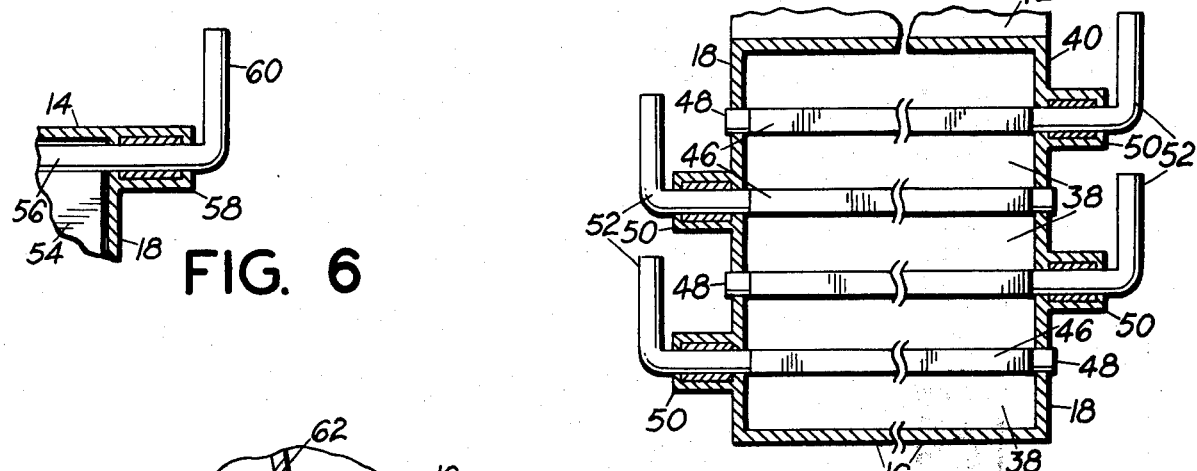
FIG. 5
FIG. 7

APPARATUS FOR WASHING STACK GASES

BACKGROUND OF THE INVENTION

This invention relates to new and useful improvements in apparatus for washing stack gases and the like.

Apparatuses have heretofore been proposed to remove solids from stack gases by subjecting them to water spray. Such spray entrains the solid particles and dissolves the water solubles so that the particles can be collected at the bottom. In the movement of the gases through the spray, many of the particles may escape the separation effects of the spray and thus an efficient cleaning operation is not accomplished. Exemplary washing devices for stack gases and the like are shown in U.S. Pat. Nos. 2,802,543 and 3,260,036 wherein gases are passed through washing chambers for removing impurities therefrom.

Another disadvantage of prior devices is that they require rather complex installation for carrying the gases thereto. That is, extensive pump and conduit means are necessary to convey the gases from the stack outlet to the washing apparatuses.

SUMMARY OF THE INVENTION

According to the present invention and forming a primary objective thereof, apparatus for washing stack gases is provided that employs means for moving the gases in an improved manner while being repeatedly washed along their path so that solids are efficiently removed therefrom. This is accomplished by means of a blower arranged to move the stack gases through a housing having a plurality of baffle plates disposed to cause the gases to move in a tortuous path, and at the same time including washing sprays for washing the gases at various stations along the path of movement.

Another object is to provide apparatus of the type described employing novel adjustable support means for the baffle plates so that the tortuous path for the gases can be changed as desired.

Still another object is to provide apparatus of the type described wherein the forced air from the blower is arranged to be directed across the top of the stack to a controlled extent to assist in the discharge of gases from the stack.

Yet another object of the invention is to provide apparatus of the type described wherein the housing is adaptable for direct association with the top outlet of a stack so that the present apparatus is adaptable for mounting directly on the stack.

The invention will be better understood and additional objects and advantages will become apparent from the following description.

BRIEF DESCRIPTION OF THE DRAWINGS

FIG. 1 is a side elevational view, somewhat diagrammatic and partly broken away, of apparatus of the present invention in combination with a stack;

FIG. 5 is an enlarged foreshortened sectional view taken on the line 5—5 of FIG. 2B;

FIG. 6 is an enlarged fragmentary sectional view taken on the line 6—6 of FIG. 3; and FIG. 7 is an enlarged fragmentary sectional view taken on the line 7—7 of FIG. 2B.

DETAILED DESCRIPTION OF A PREFERRED EMBODIMENT

Figure 2A:
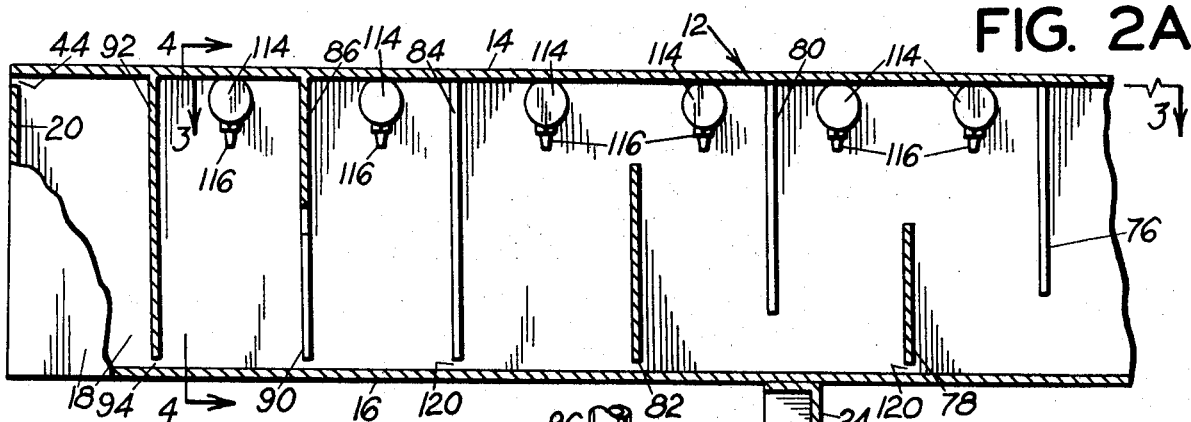
FIG. 2A is a fragmentary side elevational view of a portion of a housing of the present apparatus, a near wall of the housing being broken away to show inner structure.
Figure 2B:
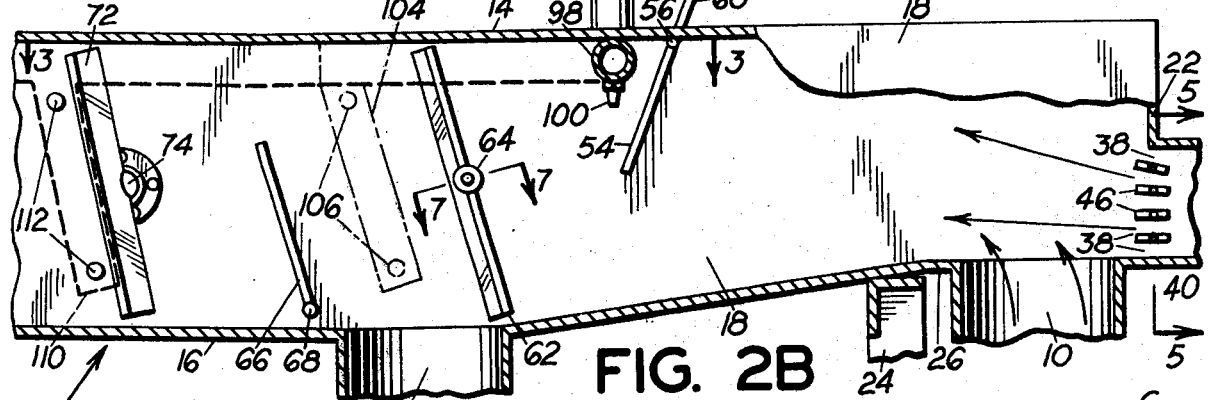
FIG. 2B is a fragmentary elevational view similar to FIG. 2A and showing the rest of the housing, the left end of FIG. 2B forming an extension of the right end of FIG. 2A in an integrated structure.

With reference first to FIGS. 1 and 2B, the numeral 10 designates a conventional stack such as one in which gases or other effluents are discharged upwardly. Such stack may comprise any industrial stack or the like wherein it is desired that its outlet, hereinafter referred to as stack gases, be cleaned of contaminants.

Figure 3:
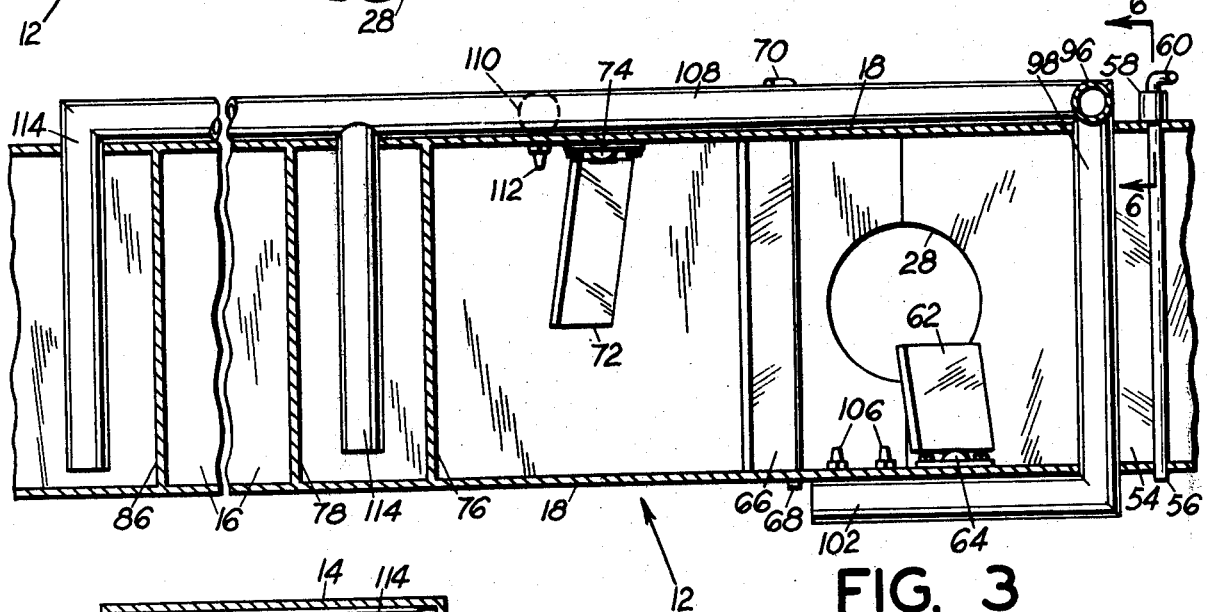
FIG. 3 is a foreshortened horizontal sectional view taken on the line 3—3 extending through FIGS. 2A and 2B.

The apparatus comprises in general an elongated tubular housing 12 having a top wall 14, FIGS. 2A, 2B and 3, a bottom wall 16, side walls 18 and opposite end walls 20 and 22.

Housing 12 is supported on suitable standards 24 in an arrangement such that it is disposed adjacent one end thereof across the top of the stack 10, the bottom wall 16 having an inlet opening 26 arranged to receive the stack and establish communication between the top of the stack and the interior of the housing. A drainage outlet 28 is provided intermediate the ends of the housing, preferably adjacent the inlet opening 26, and such outlet has a pair of branch conduits 30, FIG. 1, for discharging drainage liquid into receptacles 32. Branch conduits 30 are associated with a two position control valve 34 arranged to direct the drainage liquid into one or the other of the receptacles for continuing operation of the apparatus. In small systems the receptacles may be removed to another site for processing the collected liquid for recovery of desired components. In large systems the outlet 28 may be coupled by elongated conduit to the processing site.

Housing 12 has an end opening 38 in the wall 22 in communication with an outlet 40 from a blower 42 integrated with the end of the housing and arranged to forcefully move air through the housing. An outlet opening 44 is provided in the end wall 20 of the housing, such opening being provided at the upper end of the wall and comprising a narrow full width slot.

As best noted in FIG. 2B, the inlet opening 26 in the housing for the stack 10 is closely adjacent to the inlet 38 from the blower, and the forced air from the blower can sweep across the top of the stack. Such air movement is capable of creating a vacuum in the area above the stack in a Venturi principle and is capable of assisting in the discharge of gases from the stack. It is desired that this vacuum effect be controlled, however, and for this purpose a plurality of laterally extending louvers 46, also seen in FIG. 5, are disposed in the opening 38. These louvers have integral end shaft portions 48 journaled in housing walls 18, one of the shaft portions of each louver projecting through a friction bushing 50. One of the shaft portions for each louver is bent into a handle portion 52. Adjacent ones of the handle portions 52 are staggered on opposite sides of the housing for working clearance.

Friction bushings 50 are capable of holding the louvers where set, and the selected direction of flow from the pump into the housing is thus controlled by a suitable setting of the louvers. For example, if it is desired that maximum vacuum influence be imparted on the output of the stack 10 to assist in drawing gases out of the stack, the louvers are adjusted to a horizontal or downwardly tilted position, thus providing a direct flow across the top of the stack. On the other hand, if it is desired that the pump outlet have a lesser influence on the output of the stack, or substantially none at all, the louvers are tilted upwardly at the necessary angle.

A plurality of baffle plates now to be described are mounted in the housing to cause the forced air from the blower and the stack gases to move in a tortuous path for efficient washing by spray means later to be described. The first baffle plate 54 to be impinged by the gases, FIGS. 2B, 3 and 6, extends downwardly from the top of the housing and terminates short of the bottom. This baffle plate extends the full width of the housing and integrally depends from a cross shaft 56 journaled in opposite sides of the housing at an upper portion thereof. One end of this shaft extends through a friction bushing 58 and has a bent end portion forming a handle 60.

A second baffle plate 62, FIGS. 2B, 3 and 7, is located downstream from the baffle plate 54 and extends laterally from a universal pivot joint 64 connected to one side wall of the housing. This baffle plate extends substantially the full height of the housing but it is of less width than the housing. Universal pivot joint 64 is of frictional structure to hold the baffle plate 62 in a set position but at the same time is adjustable for selected setting. A handle 65 projects outwardly from the pivot joint for setting the baffle plate.

A third baffle plate 66 is disposed downstream from the baffle plate 62 and is secured on a lower cross shaft 68 journaled in opposite sides of the housing and having a projecting handle 70 for adjustment thereof. This baffle plate extends the full width of the housing but terminates short of the top wall. Shaft 68 is associated with a friction bushing, not shown, similar to that designated by the numeral 58 for shaft 56 in order that the baffle plate 66 will remain in a position where set.

Another baffle plate 72 is located downstream from baffle plate 66 and is supported on the opposite side wall from the baffle plate 62 by a universal pivot connection 74 having sufficient friction therein to maintain the baffle plate 72 in a set position. Baffle plate 72 extends substantially the full height of the housing but is of less width than the housing.

The four baffle plates 54, 62, 66, and 72 by their construction and disposition cause a desired initial tortuous path of movement for the stack gases. More particularly, and as viewed from the lower end of the housing, the stack gases will first sweep downward under the baffle plate 54, then laterally to the right around the baffle plate 62, then upward over baffle plate 66, and then laterally to the left around the baffle plate 72 and downward under baffle plate 76. The movement of gases through this part of the housing as a result of the influence from these baffle plates will be in a spiral pattern counterclockwise as viewed from right to left in FIG. 2B. The extent of the turbulence imparted to the gases in such spiral movement can be varied by selected adjustment of the baffle plates. For example, with reference to FIG. 2B, the baffle plates are angled slightly rearwardly and such adjustment provides a medium amount of turbulence to the gases. By adjusting the vanes on their shafts or universal axis for a more direct impingement of the gases thereagainst, the turbulence can be increased. The settings of the baffle plates for the desired turbulence is determined empirically for best treatment of particular gases.

Downstream from the baffle plate 72, FIGS. 2A and 3, are stationary baffle plates 76, 78, 80, and 82. These baffle plates extend the full width of the housing and alternately project from the top and bottom of the housing. Baffle plates 76 and 80 extend down from the top of the housing but terminate short of the bottom, the baffle plate 80 extending down a short distance more than baffle plate 76. Baffle plates 78 and 82 extend up from the bottom of the housing but terminate short of the top, the baffle plate 82 extending up a short distance more than the baffle plate 78.

Figure 4:
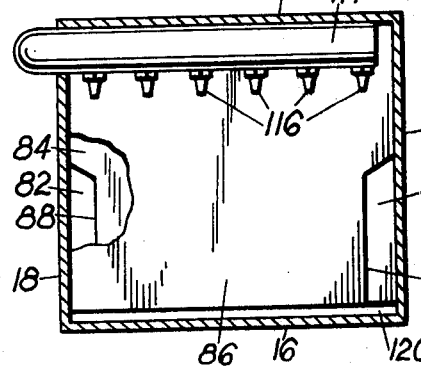
FIG. 4 is a vertical sectional view, partly broken away, taken on the line 4—4 of FIG. 2A.

Downstream from the baffle plate 82 is a baffle plate 84 and downstream from the baffle plate 84 is a baffle plate 86. These two baffle plates extend the full height of the housing and also extend the full width of the housing with the exception that baffle plate 84, best seen in FIG. 4, has a notch 88 in one side edge thereof and baffle plate 86 has a notch 90 on the opposite side edge. A final baffle plate 92 is provided downstream from the baffle plate 86. This baffle plate extends the full width of the housing and vertically extends down from the top to a point terminating short of the bottom to form a narrow, full width bottom opening 94.

The gases are washed repeatedly through the length of the housing, and to accomplish this washing function an inlet conduit 96, FIGS. 1, 2B and 3, has communication with a manifold 98 extending laterally in the upper interior of the housing closely adjacent to the baffle plate 54 downstream therefrom. Manifold 98 has a plurality of downwardly directed nozzles 100 thereon arranged in number and a spray pattern outlet to provide a full width curtain or fog of spray. Manifold 98 has a conduit extension 102 on the opposite side from the inlet conduit 96, and a manifold 104 extends in a downward direction in tilted relation adjacent to and downstream from baffle plate 62. A pair of nozzles 106 are supported by the manifold 104 and produce an upright curtain of spray laterally across the housing. Manifold 104 and nozzles 106 are shown in phantom lines in FIG. 2B since these parts are out of the plane of view in this figure.

A conduit extension 108 from the inlet conduit 96 extends along the outside of the housing at the upper portion thereof, and a manifold 110 extends downwardly therefrom in tilted relation closely adjacent to and downstream from the baffle plate 72. A pair of nozzles 112 are supported by this manifold and project laterally into the housing for directing a curtain of spray across the housing at this point.

Conduit extension 108 leads substantially to the outlet end of the housing and feeds a plurality of cross manifolds 114 disposed between each of the remaining baffle plates with the exception of that area between baffle plate 92 and end wall 20. Each of the manifolds 114 supports a plurality of nozzles 116 in an arrangement and spray pattern to provide a downwardly directed curtain of water between each of the baffle plates mentioned.

The bottom wall 16 of the housing inclines downwardly from each end thereof toward the drainage outlet 28 so that the liquid from the nozzles will gravitate to such outlet. To allow free flow of the liquid down the inclines, a space 120 is provided between the bottom of the housing and those baffle plates which are disposed in a lower position in the housing and which are between spray means and the outlet.

In the operation of the present washing apparatus, the louvers 46 are first adjusted to control the vacuum influence of the blower output on the stack 10. If it is desired that very little or no influence be provided on the discharge of the stack gases, the louvers are titled upwardly so that the blower output substantially by-passes the immediate discharge area of the stack. On the other hand, if it is desired to assist in the discharge of the stack gases, the louvers are adjusted to a horizontal or downwardly tilted position.

The moving gases are caused to to be spiralled when they impinge baffle plates 54, 62, 66 and 72. Such gases are washed by spray nozzles 100, 106, and 112 during this time. The gases will then move in a zig zag or sinuous pattern through the baffle plates 76, 78, 80, and 82 and be further washed by the spray nozzles 116 adjacent each of such baffle plates. After moving past the baffle plate 82, the gases will be diverted to the one side for passage through notch 88 in the baffle plate 84 and then to the other side for passage through the notch 90 of the baffle plate 86. After moving past each baffle plate 84 and 86, the gases are washed and then they flow down for movement through the space 94. The gases then move up for discharge through outlet opening 44. The number of nozzles used at each washing station may vary, it being desired however that a good curtain of spray be provided. It is particularly desirable that the last washing station, namely, the one between baffle plates 86 and 92, have a forceful washing action. Thus, six nozzles are shown, FIG. 4, whereas a lesser number of nozzles may suffice at other of the stations. Steam may be injected with the liquid spray to increase the turbulence and enhance the washing action.

By means of the extreme turbulence created by the arrangement of baffle plates and by the multiple washing effected at the plurality of spraying stations during turbulence, efficient cleansing of the gases by settling out of the solids and the dissolving of liquid solubles is accomplished. In this regard, the washing liquid may be water, or it may be aqueous solutions of chemicals predetermined to react with components in the stack gases to effect their removal.

In the event it is found that additional spray washing is necessary to effect the desired cleansing, one or more additional sections of housing shown in FIG. 2A may be interposed between the baffle 92 and wall 20, as will be understood.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. Apparatus for washing stack gases and the like, comprising:
   a. a hollow housing defined by top, bottom and side walls and having an outlet at one end,
   b. means arranged to support said housing in substantially a horizontal position across the top of a stack,
   c. stack gas inlet means in the bottom wall of said housing adjacent the end opposite said outlet arranged to communicate with the top opening of a stack and to receive stack gases therefrom.
   d. blower means having an outlet communicating with the end of the housing opposite said outlet for directing air from the blower means across the stack gas inlet means toward the housing outlet,
   e. a plurality of baffle means supported in said housing on the opposite side of said stack gas inlet means from the blower means and having face portions arranged to be impinged by gases forced through said housing,
   f. said baffle means being located in said housing in an arrangement providing a tortuous path of movement of the stack gases through the housing,
   g. liquid spray means disposed between said baffle means to wash the gases,
   h. means defining a discharge opening in the bottom wall of said housing for discharging liquid from said spray means, and
   i. adjustable mounting means for some of said baffle means in said housing, said adjustable mounting means providing adjustment of certain of said some of said baffle means on an axis at right angles to the longitudinal length of the housing and providing adjustment of others of said some of said baffle means on a universal axis whereby to establish a selected path of tortuous movement of stack gases through said housing.

2. Apparatus for washing stack gases and the like, comprising:
   a. a hollow housing defined by top, bottom and side walls and having an outlet at one end,
   b. means arranged to support said housing in substantially a horizontal position across the top of a stack,
   c. stack gas inlet means in the bottom wall of said housing adjacent the end opposite said outlet arranged to communicate with the top opening of a stack and to receive stack gases therefrom,
   d. blower means having an outlet communicating with the end of the housing opposite said outlet for directing air from the blower means across the stack gas inlet means toward the housing outlet,
   e. a plurality of baffle means supported in said housing on the opposite side of said stack gas inlet means from the blower means and having face portions arranged to be impinged by gases forced through said housing,
   f. said baffle means being located in said housing in an arrangement providing a tortuous path of movement of the stack gases through the housing,
   g. said baffle means including, in downstream sequence, a first baffle plate extending across said housing down from the top but terminating short of the bottom of the housing, a second baffle plate extending inwardly from one side of said housing but terminating short of the other side, a third baffle plate extending across said housing up from the bottom but terminating short of the top of the housing, a fourth baffle plate extending inwardly from the opposite side of said housing from said second baffle but terminating short of the other side, said baffle plates imparting a spiral motion to said gases as the latter are forced through the housing,
   h. liquid spray means disposed between said baffle means to wash the gases, and
   i. means defining a discharge opneing in the bottom wall of said housing for discharging liquid from said spray means.

3. The apparatus of claim 2 wherein said first and third baffle plates are pivotally adjustable on a horizontal axis and said second and fourth baffle plates are pivotally adjustable on a universal axis.

4. The apparatus of claim 2 wherein said first and third baffle plates are pivotally adjustable on a horizontal axis and said second and fourth baffle plates are pivotally adjustable on a universal axis, said baffle means including a plurality of additional baffle plates downstream from said fourth baffle plate, said latter baffle plates extending across said housing and also extending alternately from the top and bottom in partially projecting relation to impart a zig zag path to said gases.

5. The apparatus of claim 2 wherein said liquid spray means includes first spray nozzles located between said first and second baffle plates, said first spray nozzles being disposed at an upper portion of said housing and directing liquid spray downwardly the width of said housing, second spray nozzles located between said second and third baffle plates and also located adjacent to and downstream from said fourth baffle plate, said second spray nozzles being disposed upright along an inner side of said housing and directing liquid spray across said housing.

* * * * *